3,367,920
POLYUREA AND METHOD OF
PREPARING SAME
David Wasserman, Springfield, and John D. Garber, Allendale, N.J., assignors to Merck & Co., Inc., Rahway, N.J., a corporation of New Jersey
No Drawing. Filed Nov. 24, 1964, Ser. No. 413,623
13 Claims. (Cl. 260—77.5)

ABSTRACT OF THE DISCLOSURE

A solid polyurea which consists of a plurality of units which recur, each unit being of the formula

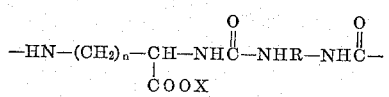

wherein each X may be hydrogen, alkali metal, or alkyl, $n$ may be 3 or 4 and wherein R in each recurring unit may be alkylene, phenylene, mononuclear divalent alkaryl, mononuclear divalent aralkylene, divalent cycloalkyl or divalent cycloalkyl alkylene.

---

This invention relates to novel compositions of matter and to methods for producing them. In one of its more specific aspects the invention is directed to novel polyureas and to methods for producing them. Each polyurea of this invention consists essentially of a plurality of units which recur and each of which is within the following generic Formula I:

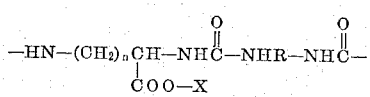

X may be the same in all of said units or X in some of said units may differ from that in the others in any individual polyurea and therefore X in each of the recurring units is independently selected from the group consisting of hydrogen, an alkali metal, preferably sodium, potassium or lithium and an alkyl radical —CH$_2$—R$_1$ wherein R$_1$ is hydrogen or an alkyl radical of 1–21 carbon atoms; $n$ may be the same in all of said units or $n$ in some of said units may differ from that in the other units of any individual polyurea and therefore $n$ in each of the recurring units is selected from the group consisting of 3 and 4; R may be the same in all of said units or R in some of said units may differ from that in the others in any individual polyurea, and therefore R in each of the recurring units is independently selected from the group consisting of hydrocarbon radicals of 2–10 carbon atoms and may be —C$_m$H$_{2m}$— wherein said radical is alkylene or alkylidene and $m$ is 2–10 or it may be phenylene, (C$_6$H$_4$=) or an alkyl substituted divalent mononuclear aryl such as CH$_3$—C$_6$H$_3$= or a mononuclear aralkylene such as (—C$_6$H$_4$—CH$_2$—) or (—CH$_2$—C$_6$H$_4$—CH$_2$—)

for example or divalent cycloalkyl radicals such as (—C$_6$H$_{10}$—) or cycloalkyl alkylene radicals such as (C$_6$H$_{10}$—(CH$_2$—)$_2$).

Those polyureas of Formula I wherein X is alkyl are produced by reacting (1) one or a combination of two or more diisocyanate alkylesters of the following generic Formula A:

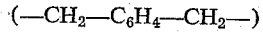
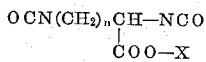

wherein X is an alkyl radical of 1–22 carbon atoms and $n$ is 3 or 4 with (2) one or a combination of two or more diamines of the following generic Formula B:

wherein R is as before defined. When X is alkyl said polyureas of Formula I are usually high melting and are further characterized by having the unexpected property of being more flexible than the corresponding polyureas derived from the conventional aromatic diisocyanates such as toluene diisocyanate. Said polyureas wherein X is alkyl may be reacted with an appropriate alkali metal compound in aqueous solution thereby to hydrolyze some or substantially all of the ester groups therein. This may be effected in one of two ways: the first involves a two phase reaction of said polyurea suspended in a 10% aqueous solution of sodium carbonate, for example, which was heated and maintained at 50°–95° C. to effect hydrolysis. The second involves solution of said polyurea in dimethyl sulfoxide followed by the addition of dilute aqueous NaOH while maintaining the pH thereof below 10.0 by slow dropwise addition. By following either of said two methods hydrolysis was substantially complete in one hour resulting in water soluble polyurea sodium salt within said generic Formula I but wherein X is sodium. Addition of 10% hydrochloric to a thrice water-diluted reaction mixture of said sodio-polyureas caused the replacement of sodium by hydrogen and resulted in the precipitation of the polyurea wherein now X is hydrogen. This precipitate was redissolved in dilute alkali and reprecipitated as before with hydrochloric acid. By controlling the proportion of alkali metal reactant the degree of replacement by sodium of the alkyl radicals in the individual polyureas may be controlled. If desired the quantity of HCl addition may also be controlled so that only some of the sodium atoms are replaced by hydrogen in the individual units of said polyureas. Thus by controlling the quantity of alkali metal reactant and/or the quantity of acid addition there may be obtained a wide variety of different polyureas of significantly different properties making them useful in a number of different fields: they are polyureas of Formula I wherein X in some of the recurring units therein is an alkali metal (preferably Na, K or Li), and in others is an alkyl radical; they are polyureas of Formula I wherein X in some of the recurring units therein is hydrogen and in other units therein is an alkyl radical; they are polyureas of Formula I wherein X in some of the recurring units therein is an alkali metal and in other units therein is hydrogen; they are polyureas of Formula I wherein X in some of the recurring units therein is hydrogen, in other units therein is an alkyl radical and in still other units therein is an alkali metal.

Those polyureas wherein X is an alkali metal are useful as soil suspension agents. For example, a suspension of activated carbon in water settled to the half way mark in 80 seconds. It has been found that the addition of a very small proportion of said sodio-polyureas held the carbon in suspension above the 50% volume line, for considerably longer periods of time measured in hours. The novel polyureas wherein X is hydrogen in at least some of the recurring units thereof provide sites of ionic attachment of basic dyes. Even those wherein the carboxylic acid groups were only partially hydrolized provided the free acid groups (—COOH) providing sites of such ionic attachment for basic dyes. The polyureas of this invention have increased dyeability and are alloyable with other polymers for imparting this property to the polymer combination.

The polyureas of Formula I wherein X is an alkyl radical were used to form clear, tough, pliable films on glass from dimethyl sulfoxide solutions thereof. The generic method for producing these novel polyureas is either by interfacial or solution polymerization. In the interfacial method it is preferred to employ a low boiling halogenated hydrocarbon such as methylene chloride, chloroform, carbontetrachloride, or polyhalogenated ethanes to dissolve a diisocyanate reactant of Formula A therein. The diamine of Formula B is dissolved in water. These two solutions are admixed with each other under efficient high speed stirring conditions whereupon the polyurea so formed precipitates out. The raw polyurea precipitate is filtered, washed free of unreacted starting materials and solvents and is then vacuum dried.

An alternate method of synthesis is by reaction of compounds of Formula A with compounds of Formula B in a non-protonic solvent. Although dioxane, ethylene glycol ethers and dimethyl formamide are useful solvents in this reaction, dimethyl sulfoxide is most preferred. A dimethyl sulfoxide solution of the diisocyanate solution of Formula A is poured into an amine solution with the same solvent while maintaining the temperature of the mass below 50° C. with good stirring and the use of a water bath cooler. The reaction was completed in most cases by subsequently heating to and maintaining said mass at 60°–80° C. for several hours. The resultant polyurea obtained was isolated by pouring the mass into 2–4 times its volume of a non-solvent such as acetone or water. After stirring for several hours with several changes of non-solvent, the dimethyl sulfoxide is leached away and the thick liquid becomes solid. The solid is dried in vacuo at 60°–100° C. to remove last traces of the sulfoxide.

Reduced viscosities of said novel polyurea esters were run either in dimethyl sulfoxide or in formic acid at 1% concentration of polyurea. The softening and melting points were taken on a Kofler Hot Bench. The melting point is the temperature at which a liquid smear appears on the hot surface when the polyurea is pressed and stroked with a hot spatula.

The following Table I shows some of the physical properties of various polyureas of this invention and namely such polyurea esters within generic Formula I but wherein X is $CH_3$ and R is the divalent hydrocarbon radical of the particular amine employed; said polyureas were produced by the methods as indicated in the table with 1 mole of lysine diisocyanate methyl ester reacted with 1 mole of the respective amines set forth in said table:

Some of the reactants within generic Formula A and methods for producing them are described in the U.S. Patent application of Garber, Wasserman and Gasser, Ser. No. 285,888 of June 6, 1963, now U.S. Patent 3,281,378. Those others as well as methods for making them are described therein. All of the reactants with generic Formula A are described in the U.S. Patent application filed of even date herewith and bearing the Ser. No. 413,599.

In general said reactants of Formula A are prepared by reacting a dihydrochloride of $C_{1-22}$ alkyl esters of ornithine or lysine with phosgene. Such reaction is carried out in the presence of a suitable solvent which is inert with respect to the reactants employed under the reaction conditions used. Examples of some of said solvent are chlorobenzene, orthodichlorobenzene, bromotoluene, chlorotoluene, benzene, toluene, dioxane, 4-chloro-1,3-xylene and dialkyl ethers of glycols and polyether glycols. The temperature at which the reaction is carried out is in the range of 50° C.–200° C. although the particular temperatures employed will be dependent upon the particular esters used as reactants.

The following are examples of some of the specific compounds within generic Formula A and methods for making them.

EXAMPLE A–1

*Lysine diisocyanate methyl ester*

250 grams of lysine monohydrochloride suspended in 2500 ml. of absolute methanol is dissolved by passing into the stirred suspension dry hydrogen chloride. The reaction temperature immediately goes up to 47° C. and in 10 minutes all the solids are dissolved. The gas is passed in for five minutes longer. The reaction mass is then permitted to cool slowly to room temperature with stirring. Crystals start to form in 2.5 hours. The reaction mass is stirred for a period of 15 hours at a temperature of 25° C. The product is precipitated by adding 1.5 liters of diethyl ether over a period of 15 minutes. After one hour of stirring, the product is isolated by filtration and washing with 3 parts of ether dissolved in two parts of methanol, followed by a diethyl ether wash. The product lysine dihydrochloride methyl ester is dried to constant weight at 65° C. in a vacuum oven.

The lysine methyl ester dihydrochloride is finely ground

TABLE I.—Polyurea Esters

| Diamine | Reaction Type | Reduced Viscosity | Viscosity Solvent | Softening Point, °C. | Melting |
|---|---|---|---|---|---|
| Ethylene diamine | 1 | 0.33 | DMSO | 157 | 167 |
| 1,3-propane diamine | 1 | 1.32 | DMSO | 140 | 170 |
| 1,6-hexane diamine | 2 | 0.267 | DMSO | 142 | 150 |
| 1,4-bis (aminomethyl) Cyclohexane | 2 | 0.936 | HCOOH | 184 | 200 |
| m-Phenylene diamine | 2 | 0.225 | HCOOH | 175 | 190 |

1. Homogenous solution in dimethyl sulfoxide (DMSO).
2. Interfacial polymerization $MeCl_2$—$H_2O$.

1. Homogeneous solution in dimethyl sulfoxide (DMSO).
2. Interfacial polymerization $MeCl_2$—$H_2O$.

The following Table II shows some of the physical properties of various polyureas of this invention and namely some polyurea free acids within generic Formula I but wherein X is hydrogen and R is the divalent hydrocarbon radical of the particular amine employed, and n is 4.

in a mortar and 186 grams is suspended in 2100 ml. of freshly dried and redistilled o-dichlorobenzene in a 3-neck flask.

Phosgene is passed into the reaction vessel at a rapid rate while raising the temperature of the suspension to 150–155° C. As the reaction proceeds the solution becomes clearer and darker. Hydrogen chloride evolution is indicated by fuming from the condenser as it hits the moist atmosphere. After twelve hours, no more hydrogen TABLE II.—Polyurea Acid

| Diamine | Reduced Viscosity | Viscosity Solvent | Softening Point, °C. | Melting Point, °C | Acid Equivalent | |
|---|---|---|---|---|---|---|
| | | | | | Found | Calculated |
| Ethylene diamine | 0.30 | DMSO | 150 | 173 | 257.0 | 258.0 |
| 1,6-hexane diamine | 0.126 | DMSO | 140 | 153 | 404.5 | 314.4 |
| m-Phenylene diamine | 0.155 | HCOOH | 220 | 232 | 455 | 306 | chloride evolves. Phosgene is passed in for one more hour and nitrogen is then bubbled through the reaction vessel as the solution temperature drops to 25° C., to remove residual phosgene and hydrogen chloride. The remaining solids are removed by filtration and washed. The filtrate is then distilled and under reduced pressure. O-dichlorobenzene, the solvent, is distilled at 44° C. and 2 mm. pressure. The product lysine diisocyanate methyl ester, is distilled at 123° C., at 0.45 mm. pressure. A clear, colorless liquid product is obtained having a refractive index of 1.4565 at 24.5° C.

In an analogous manner, the lysine diisocyanate ethyl, propyl, butyl or pentyl esters are prepared by substituting equivalent amounts of ethanol, propanol, butanol or pentanol for methanol in the foregoing procedure.

EXAMPLE A-2

Lysine diisocyanate octyl ester 18.2 grams (0.1 mole) of L-lysine monohydrochloride is suspended in 140 ml. of n-octanol containing 0.24 mole of p-toluenesulfonic acid. The mixture is heated until water and octanol begin to distill and the reaction temperature is then maintained at 120–130° C. by addition of n-octanol. After 240 ml. of n-octanol are added and removed over a two hour period, the residual alcohol is removed by vacuum stripping. The waxy reaction product, the di-p-toluenesulfonate salt of lysine diisocyanate n-octyl ester, is recrystallized from a mixture of ethanol and ether.

A solution of 73 grams of this waxy product in 150 ml. methanol is adsorbed on a column of 500 ml. of a strongly basic styrene-divinylbenzene anion exchange resin (Dowex 1-X8) which had previously been activated on the hydroxyl cycle with aqueous ammonia, washed to neutrality, and had its water displaced with methanol. The product is eluted from the column with methanol. The free base ester is not isolated but converted to the dihydrochloride by addition of anhydrous HCl and the dihydrochloride recovered by precipitation with diethyl ether. The dihydrochloride is suspended in 275 ml. of toluene and 0.45 mole of phosgene added at 60–70° C. When evolution of HCl ceases, the temperature of the reaction mass is gradually increased to strip out the solvent. The product, lysine diisocyanate n-octyl ester is recovered by vacuum fractionation, B.P. 137–142° C. at 0.2 mm.

When the foregoing procedure is repeated using equivalent amounts of hexanol, decanol, dodecanol, or tetradecanol in place of octanol, the corresponding hexyl, decyl, dodecyl, or tetradecyl ester of lysine diisocyanate is obtained.

EXAMPLE A-3

Ornithine diisocyanate hexyl ester

A suspension of 16.8 grams (0.1 mole) of L-ornithine monohydrochloride in 100 ml. of n-hexyl alcohol containing 45.6 grams of p-toluenesulfonic acid monohydrate was heated to 110° C. for reaction while water and some hexanol were removed therefrom. Hexanol was added to replace that lost from the reaction mixture. After water evolution ceased the excess hexanol was removed by vacuum stripping and the residue recrystallized once from ethanol-diethyl ether. Without further purification, methathesis was effected over a "Dowex 1-X8" column in the general manner set forth in Example A-2 herein. The effluent was neutralized with HCl and the resultant L-ornithine hexyl ester dihydrochloride was recovered by precipitation with diethyl ether. The dihydrochloride was treated in the manner set forth in Example A-2 whereby ornithine diisocyanate hexyl ester was recovered.

When the foregoing procedure is repeated using equivalent amounts of other alkanols such as butanol, octanol, decanol, dodecanol or tetradecanol in place of hexanol the corresponding butyl, octyl, decyl, dodecyl, or tetradecyl ester of ornithine diisocyanate is obtained.

EXAMPLE A-4

L-lysine butyl ester diisocyanate

To a suspension of 18.2 grams (0.1 mole) of L-lysine monohydrochloride in 80 ml. of n-butanol was added 0.24 mole of p-toluene sulfonic acid. The mixture was heated until water and butanol distilled and then addition of n-butanol began to maintain a constant reactor volume. After 240 ml. of n-butanol had been added and removed over a two-hour period, the residual butanol was removed by vacuum stripping. The oily residue was recrystallized from ethanol-diethyl ether to yield 88% of product, M.P. 146–148° C. Analyses were satisfactory for $C_{24}H_{38}N_2S_2O_8$—.

Calc'd.: 52.7% C, 7.0% H, 11.7% S. Found 52.5% C, 6.9% H, 11.4% S.

A second crop was recovered to make the overall yield 95%.

This product was converted into the corresponding dihydrochloride by use of an ion exchange resin to produce the free ester and then by treatment with HCl. The dihydrochloride was reacted with phosgene in the manner described in Example A-2 thereby to obtain the diisocyanate ester.

EXAMPLE A-5

L-lysine stearyl ester di-p-toluenesulfonate and diisocyanate

A mixture of 18.2 grams lysine monoydrochloride, 45.6 grams of p-toluene sulfonic acid hydrate and 270 grams of stearyl alcohol was heated at 125–128° C. for 2 hours. The product was washed well with ether to remove the excess alcohol and recrystallized from a mixture of methanol-ether. In spite of a relatively high M.P. range, 161–199° C., the sample analyzed correctly for $C_{36}H_{66}N_2S_2O_8$—.

Calc'd.: 61.4% C, 8.9% H, 3.8% N. Found: 61.7% C, 8.7% H, 3.9% N.

This product was converted to its hydrochloride salt and precipitated out with ether, and finally reacted with phosgene all in the manner of Example A-2 thereby to produce its diisocyanate which was recovered.

EXAMPLE A-6

L-lysine-decyl ester dihydrochloride and its diisocyanate 25 grams of L-lysine ether ester dihydrochloride, melting point 145° C., was suspended in 200 cc. of "Enjay decyl alcohol." ("Enjay decyl alcohol" was a mixture of 10 carbon primary alcohols chosen because it was cheaper than n-decyl alcohol.) The suspension was heated to and maintained at 110°–115° C. while anhydrous HCl was passed therein. A clear solution was obtained in about one hour. Then mild vacuum was applied with continued HCl sparging until 40 cc. of alcohol-water were removed. The mixture was allowed to cool to 25° C. and HCl sparging was discontinued. Then 250 cc. of anhydrous ether was added thereto and the L-lysine-decyl ester dihydrochloride precipitated out as a gum which was washed with ether as in the first example.

Then to said gummy mass was added 250 cc. of toluene and the mixture was prosgenated at 65°–70° C. for 5½ hours until no more HCl evolved. Only trace amounts of solids were present. The mixture was fractionated as follows:

Cut #1, B.P. 102° C./4.5 mm_____ 1.4 grams $n_D{}^{25}=1.4409$.
  I.R.: Mostly O—C(=O)—Cl and small amount of NCO.
  Found: Cl=12.95%.
Cut #2, B.P. 95–105° C./0.060 mm___ 2.7 grams $n_D{}^{25}=1.4529$.
  I.R.: Mostly L-lysine ethyl ester diisocyanate.
  Found: Cl=1.07%.
Cut #3, B.P. 120–135° C./0.080 mm__ 2.6 grams $n_D{}^{25}=1.4565$.
  I.R.: Similar to cut #4 but small amount of L-lysine ethyl ester diisocyanate impurity.

Cut #4, B.P. 135–145° C./0.080 mm__ 2.9 grams n$_D^{25}$=1.4591, water white.
  Found C=63.78, H=8.46, N=8.97, Cl=0.25.
  Calculated for C$_{18}$H$_{30}$N$_2$O$_4$:
  C=63.88, H=8.97, N=8.28.
Cut #5, B.P. 144–150° C./0.075 mm__ 19.75 grams n$_D^{25}$=1.4593, water white.
  Found: C=64.17, H=8.95, N=8.64, Cl=trace.
  Calculated for C$_{18}$H$_{30}$N$_2$O$_4$:
  C=63.88, H=8.94, N=8.28.

Cuts 4 and 5 represent a yield of 66.4% of diisocyanate based on L-lysine ethyl ester dihydrochloride.

The other ornithine and lysine diisocyanate alkyl esters of Formula A may be prepared in any convenient manner. For example they may be prepared by first reacting the monochloride of ornithine or lysine with the other C$_{1-22}$ carbon atom alkanols in the presence of p-toluene sulfonic acid in the manner heretofore illustrated or described in application 285,888, now U.S. Patent 3,281,378, to produce the ornithine or lysine alkyl ester sulfonates, which are then converted to their dihydrochlorides which in turn are reacted with phosgene to produce said diisocyanate alkyl esters. An alternate method which may be employed to provide the dihydrochloride alkyl esters of ornithine or lysine for reaction with phosgene is to first react lysine in the conventional manner in the presence of HCl preferably with methanol or ethanol to provide the dihydrochloride methyl or ethyl ester thereof, or ornithine in the conventional manner in the presence of HCl preferably with n-propanol to provide the dihydrochloride of its propyl ester. These in turn are transesterified by, in the presence of HCl catalyst, heat reacting said hydrochlorides with an alkanol having up to 22 carbon atoms whereby to provide the dihydrochlorides of the higher alkyl esters of lysine or ornithine. Generally, when the lower alkyl esters are employed the phosgenation temperature is between 130° and 160° C. whereas when the higher alkyl esters are used the temperature of phosgenation is in the range of 50° C. up to 100° C. The reactions may, however, be run at lower temperatures with an increase in the reaction time.

So much of both of said herein identified applications which disclose the production of the alkyl esters of α-amino acids and/or their diisocyanates are included herein and by this reference are made part hereof and therefore shall have the same force and effect as if they were in their entirety recited herein.

The following are specific examples of methods for preparing some of the novel polyureas of this invention and also of some of the polyureas produced thereby. These examples are given by way of illustration and not limitation.

EXAMPLE 1

*Preparation of lysine ethyl ester-ethylene diamine polyurea*

|  | Grams | Moles |
|---|---|---|
| Solution I: |  |  |
|   Ethylenediamine | 12.3 | 0.2 |
|   Dimethylsulfoxide, 175 Mls. |  |  |
| Solution II: |  |  |
|   Lysine diisocyanate methyl ester | 42.2 | 0.2 |
|   Dimethylsulfoxide, 100 Mls. |  |  |
| III: Acetone, 600 Mls. |  |  |

Solution II was added to Solution I keeping the temperature below 50° C. with water bath cooling. The resultant solution was then heated to and maintained at 60° C. for five hours to assure a high degree of reaction with consequent formation of lysine ethyl ester-ethylene diamine polyurea in high yield. This mass was then poured into III whereby the polymer, which was gummy, precipitated out. The gummy polymer solidified on standing in said III overnight. After filtration and vacuum drying, the yield of polymer was greater than the theoretical value indicating incomplete removal of solvent. After grinding in a mortar and pestle and screening through a 60-mesh screen, the particles of polymer were extracted two times with 400-ml. portions of hot acetone. After filtration and drying, the polymer weighed 46.5 grams (85.5% yield), and is known as Product 1.

Nitrogen analysis: Calc'd, 20.59%. Found, 20.39%.

A 1% solution of Product 1 in dimethyl sulfoxide had a reduced viscosity of 0.33 using a Canon-Fenske viscosimeter at 25° C. The reduced viscosity was calculated by the formula:

$$\text{Reduced viscosity} = \frac{t - to}{to\ C}$$

where $t$ = time of flow of sample
$to$ = time of flow of solvent
$C$ = concentration of polymer in grams per 100 ml. of solution.

EXAMPLE 2

*Lysine methyl ester-1,3-propane polyurea*

|  | Grams | Moles |
|---|---|---|
| Solution I: |  |  |
|   1,3-propanediamine | 14.8 | 0.2 |
|   Dimethyl sulfoxide | 50 |  |
| Solution II: |  |  |
|   Lysine diisocyanate methyl ester | 42.2 | 0.2 |
|   Dimethyl sulfoxide | 142 |  |
| III: Acetone, 500 Mls. |  |  |

Added Solution II to Solution I with stirring and cooling to keep the temperature below 50° C. After all of Solution II was added, heated mass for sixteen hours at 60° C., for reaction completion. At the end of that time the mass was in the form of a thick solution. The thick solution was poured into III whereupon the polyurea reaction product separated out and lumped. The lumps were broken down after several hours of agitation and filtered. This was resuspended in acetone and washed several times with 400 ml. portions of hot acetone. Yield of lysine methyl ester-1,3-propane polyurea, known as Product 2, was 47.0 grams (82.5% of theoretical yield).

A 1% solution of Product 2 in dimethyl sulfoxide had a reduced viscosity of 1.32 at 25° C.

*Protective coating.*—One gram of Product 2 dissolved in 19.0 g. of dimethyl sulfoxide was used to coat a glass panel. After driving off the dimethyl sulfoxide by heating at 100° C. in an oven for one hour followed by heating at 140° C. for one hour, a clear, tough, pliable film was left on the glass upon cooling to 25° C.

EXAMPLE 3

*Lysine methyl ester-1,6-hexane polyurea*

|  | Grams |
|---|---|
| Solution I: |  |
|   Hexamethylene diamine, 70% aq. | 16.6> |
|   Water | 40.0 |
| Solution II: |  |
|   Lysine diisocyanate methyl ester | 21.2 |
|   Methylene chloride | 280.0 |

Solution I was placed in a Waring Blendor and Solution II was slowly added with stirring in 10 minutes. Solid polymer formed immediately. A solution of 1:3 water and methanol, 400 ml., was added to the polymer paste. After filtration and washing with the same solvent combination, the product was vacuum dried. The resultant white polymer solid, lysine methyl ester-1,6-hexane polyurea, known as Product 3, weighed 15.35 grams and analysed 17.10% for nitrogen (calculated value 17.05%).

A 1% solution of Product 3 in dimethyl sulfoxide had a reduced viscosity of 0.267 at 25° C.

Product 3, was soluble in formic acid and dimethyl sulfoxide but was only slightly soluble in dimethyl formamide.

EXAMPLE 4

*Preparation of lysine methyl ester-1,4-bis(aminomethyl) cyclohexane polyurea [(1-carbomethoxy pentamethylene-1,5)-(xylyl 1,4) polyurea]*

|  | Grams | Moles |
|---|---|---|
| Solution I: |  |  |
| Bis-amino methyl cyclohexane | 13.6 | 0.1 |
| Water, 50 mls. |  |  |
| Solution II: |  |  |
| Lysine diisocyanate methyl ester | 21.2 | 0.1 |
| Methyl chloride, 200 mls. |  |  |

Solution II was added to Solution I in a Waring Blendor in the presence of 50 grams of ice to keep the temperature below 40° C. whereupon the polyurea was produced and precipitated out in the form of white solid material. The white solid polymer was washed twice with 400 ml. portions of methanol. After drying, the polyurea, known as Product 4, weighed 30.5 grams (87.5% of theory). The polymer softened at 184° C. and melted at 200° C. on the Kofler Hot Bench. A 1% solution of Product 4 in 88% formic acid had a reduced viscosity of 0.936.

EXAMPLE 5

*Polyurea from lysine diisocyanate methyl ester and m-phenylene diamine*

|  | Grams | Moles |
|---|---|---|
| Solution I: |  |  |
| m-Phenylene diamine (recrystallized) | 5.4 | 0.05 |
| Water | 20.0 |  |
| Solution II: |  |  |
| Lysine diisocyanate methyl ester | 10.6 | 0.05 |
| Methylene chloride | 50.0 |  |

In a Waring Blendor was placed Solution I. Then Solution II was slowly added thereto whereupon a tan solid was produced. This was washed twice with acetone after breaking up the solid mass of polymer to smaller pieces. After drying at 70° C. and 0.1 mm. pressure in a vacuum oven for 5 hours, the polyurea, known as Product 5, weighed 16.0 grams (100% of theory).

Reduced viscosity (1% of Product 5 in 88% formic acid) = 0.225.

Product 5 softened at 175° C., and melted at 190° C.

EXAMPLE 6

*Polyurea from lysine methyl ester free base and lysine diisocyanate methyl ester [(1-carbomethoxy pentamethylene 1,5)polyurea]*

|  | Grams | Moles |
|---|---|---|
| Solution I: |  |  |
| Lysine methyl ester dihydrochloride | 23.6 | 0.1 |
| Water, 750 mls. |  |  |
| Solution II: |  |  |
| Lysine diisocyanate methyl ester | 21.3 | 0.1 |
| Methylene Chloride, 1,000 mls. |  |  |
| Solution III: |  |  |
| Sodium hydroxide | 8.0 |  |
| Water, 250 mls. |  |  |

The three solutions were cooled individually to 10° C. Solution II was placed in a 1 gallon Waring Blendor. Solutions I and III were added simultaneously to the blender with stirring in a one-minute period. After stirring for 3 more minutes, the heavy creamy mass was poured into 4 liters of water at 50° C. The methylene chloride was evaporated slowly at this temperature. Two more washes with 4-liter portions of hot water kept at 50° C. for a total of three hours served to remove all salts and solvent. The white filtered polyurea produced was dried at 80° C. at 0.1 mm. The dry polyurea, known as Product 6, weighed 40.0 grams (90% of theory). This polyurea softened at 134° C. and melted at 150° C.

A 1% solution of Product 6 in dimethyl sulfoxide solvent had a reduced viscosity of 1.31.

EXAMPLE 7

*Hydrolysis of lysine ethyl ester-ethylene diamine polyurea (Product 1) to the free acid form of the polymer*

|  | Grams | Moles |
|---|---|---|
| I: Product 1 | 5.44 | 0.02 |
| II: Dimethyl sulfoxide | 50.0 |  |
| III: |  |  |
| Sodium hydroxide | 0.8 | 0.02 |
| Water | 10.0 |  |

I was dissolved in II in a 250-ml. beaker. Using a Beckmann pH meter, the alkaline solution III was added slowly at 25° C. so that the pH was kept below 10.4. After the last addition of III, the solution was kept for 1 hour at 25° C. with no change in pH whereby the methyl groups were replaced by sodium. The solution of the polyurea sodio-salt, known as Product S-1, was diluted with 100 ml. of water and neutralized with 10% aqueous HCl to pH 3.0. The viscous liquid after washing twice with water still had the odor of dimethyl sulfoxide. The product was redissolved in 20 ml. of 5% aqueous NaOH solution and diluted to 75 ml. with water. The polymer free acid was precipitated by the addition of 10% aqueous HCl to pH 2.0. After several washings with water, the polyurea free acid was dried at 60–70° C. at 1.0 mm. pressure. The X and R in said product, known as Product 7, were hydrogen and $C_2H_4$ respectively. Said product weight 3.1 grams (51.5% of theoretical).

Carboxylic acid equivalent weight was 257.0 (theory is 258.0). A 1% solution of Product 7 in dimethyl sulfoxide had a reduced viscosity of 0.30. The Product 7 softened at 150° C. and melted at 173° C. on the Hot Bench.

EXAMPLE 8

*Hydrolysis of Product 3 to its polymer free acid*

|  | Grams | Moles |
|---|---|---|
| Suspension I: |  |  |
| Product 3 | 3.3 | 0.01 |
| Water | 20.0 |  |
| t-Butanol | 20.0 |  |
| Solution II: |  |  |
| NaOH | 0.4 | 0.01 |
| Water | 10.0 |  |

Solution II was added to Suspension I in two hours at 60–70° C. maintaining the pH below 10.5 throughout whereupon the suspension is converted to a clear solution and then silky crystals precipitated out. After removal of the solid particles by filtration, the filtrate which was recovered contained polyurea sodio-salt known as Product S-3. It was acidified with 10% aqueous HCl whereupon the polyurea free acid was formed and precipitated out. After soaking in water several hours, the polymer hardened and was filtered. The last traces of chloride ion was removed by water washing. The solid polymer was oven dried at 60° C. at 0.1 mm. pressure, and is known as Product 8.

Carboxylic acid equivalent weight was 404.5 (calculated for 100% hydrolysis=314.4). Thus 78% of the carboxylic ester groups were converted to carboxylic groups in the polymer side chains.

A 1% solution of Product 8 in dimethyl sulfoxide had a reduced viscosity of 0.126.

The Product 8 softened at 140° C. and melted at 153° C. on the Kofler Hot Bench.

EXAMPLE 9

*Hydrolysis of ester side chain of Product 4*

|  | Grams | Moles |
|---|---|---|
| Solution I: | | |
| Product 4 | 8.0 | 0.025 |
| Dimethyl sulfoxide | 120.0 | |
| Solution II: | | |
| NaOH | 1.03 | 0.025 |
| Water | 10.0 | |

Solution II was added to Solution I in 20 minutes keeping the pH below 10.4. The reaction solution was kept at 25° C. for one hour and then diluted with 100 ml. of water whereby the methyl radicals were replaced by sodium. The sodium salt of the polymer acid, known as Product S–4, was converted to the free acid polymer by the addition of 10% aqueous HCl until the pH was 2.0. A yield of 6.5 grams (85% of theoretical) of the polymer free acid, known as Product 9, was obtained by first breaking up the polymer to small particles, and washing until the filtrate was chloride-free, followed by drying at 58° C. and 0.1 mm. pressure in a vacuum oven.

Product 8 softened at 220° C. and melted at 232° C.

The carboxylic acid equivalent weight was 455 (theory for 180% by hydrolysis of ester=306).

The reduced viscosity (1% of Product 9 in 88% HCOOH) was 0.155.

EXAMPLE 10

*Hydrolysis of Product 5*

|  | Grams | Moles |
|---|---|---|
| I: Product 5 | 22.4 | 0.05 |
| Solution II: | | |
| Sodium Carbonate | 11.9 | 0.11 |
| Water | 125.0 | |

To Product 5 was added Solution II and stirred at 50° C. for 48 hours. All but a small fraction of larger particles of Product 5 went into solution. The solution was filtered and the clear filtrate was recovered and contained the polyurea sodio-salt, known as Product S–5. The filtrate was neutralized to pH 3.0 with 10% aqueous HCl. The white precipitate was washed free of chloride ions with distilled water. After drying at 50° C. overnight in a vacuum oven, the polymer free acid, known as Product 10, weighed 12.0 grams (59% of theoretical).

Carboxylic acid equivalent weight was 382. This indicates 45% of the ester groups were hydrolyzed to the acid.

The reduced viscosity of a 1.0% solution of Product 10 in dimethyl sulfoxide was 1.0.

The partially hydrolyzed free acid softened at 153° C. and melted at 178° C. on the Kofler Hot Bench.

EXAMPLE 11

*Prepartion of ornithine hexyl ester-ethylene diamine polyurea, its sodio salt and free acid*

|  | Grams | Moles |
|---|---|---|
| Solution I: | | |
| Ethylene diamine | 12.3 | 0.2 |
| Dimethylsulfoxide, 175 mls. | | |
| Solution II: | | |
| Ornithine Diisocyanate hexyl ester | 39.4 | 0.2 |
| Dimethyl sulfoxide, 100 mls. | | |
| Solution III: Acetone, 500 mls. | | |

Follow procedure of Example I but use above recited components, whereby the polyurea, known as Product 11 was obtained. Follow procedure of Example 7 and replace Product 1 therein with 5 grams of Product 11 whereby there was first produced the sodio salt, known as S–6, and then the corresponding polyurea free acid known as Product 12.

Said polyureas of this invention find application in a number of different fields. Some of them find especial use in films as such or as coatings for paper, metal foils, glass fabric and the like, and others find escpecial use as soil suspension agents in laundering or other compositions to be used for that purpose. Said polyureas, wherein X, in each of said units heretofore defined, is a higher alkyl radical, are substantially water insoluble and are useful as binding and coating agents for matte or woven glass fabrics and are also useful as coating agents for other sheet material and in addition as useful per se in film form for packaging. The polyureas, wherein X is sodium in each of said units, are useful as soil suspension agents and also carbon particle suspension agents in aqueous media and find use in laundering to prevent the redeposition of foreign or soil particles which have been separated from the material being laundered and are in suspension in the course of laundering.

The polyureas, wherein X in each of their units is an alkyl radical, and especially those wherein X in each of their units is a lower alkyl radical, are useful as binding and non-dusting coating agents for laundry detergent tablets containing an alkaline material, such as caustic soda, as a component thereof and said polyureas, wherein X of each of their units is hydrogen, are useful for the same purpose. Depending upon the particular X in the recurring units of the individual polyureas, that it whether they be solely alkyl, hydrogen or alkali metal or a combination of 2 or 3 of them, all of said polyureas are useful as coating or binding agents, some of which are of especial value, when they are to serve merely as temporary agents for that purpose and are readily removable therefrom when desired and all of them are useful as binding and coating agents for laundry detergents containing caustic as a component thereof.

The following example ilustrates the soil suspension properties of some of the polyureas of this invention.

EXAMPLE B

*Soil suspension test*

The sodium salts, Products S–1, S–3, S–4 and S–5 all had soil suspension activity. Product S–1 illustrates this property.

|  | Grams | Moles |
|---|---|---|
| I: Product S–1 | 0.258 | 0.001 |
| II: | | |
| NaOH | 0.040 | 0.001 |
| Water | 10.0 | |

A solution of (Product S–1), a polymer acid sodium salt was made by adding II to I and shaking. Upon dilution to 56 ml., this contained 0.05 gram of polymer in 10 ml. of solution. A suspension of 3.5 grams of activated carbon (Merck) in 200 ml. of water was shaken and 21 ml. portions poured immediately into four 25 ml. graduate cylinders. To each of three of these cylinders was added 0.1, 1.0, and 4.0 ml. of the polymer solution above. After diluting to 25 ml. with water, they were stoppered, shaken and permitted to stand at 25° C. The carbon in the blank containing no resin settled to the half-way mark in 80 seconds. The carbon in the other three cylinders settled as shown in the table below:

| Percent Polymer In Solution | ml. of Stock Solution | Carbon Demarcation Line (ml.) After— | | |
|---|---|---|---|---|
| | | 17 hours | 25 hours | 43 hours |
| 0.002 | 0.1 | 19.0 | 17.0 | 12.5 |
| 0.02 | 1.0 | 23.0 | 23.0 | 21.0 |
| 0.08 | 4.0 | 24.0 | 24.0 | 23.0 |

The suspension containing 0.002% polymer salt had settled only 7.0 ml. in 25 hours. After 43 hours the carbon had settled below the 12.5 ml. line. The more concentrated solutions maintained the carbon in suspension even after 43 hours.

Since certain changes may be made in the specific inventions disclosed herein without departing from the spirit thereof, it is intended that all matter contained in the foregoing description be interpreted as illustrative and not in a limiting sense.

It is also to be understood that the following claims are intended to cover all of the generic and specific features of the invention described herein, and all statements of the scope of the invention, which as a matter of language might be said to fall therebetween.

We claim:

1. A solid polyurea consisting essentially of a unit which recurs and is within the generic formula:

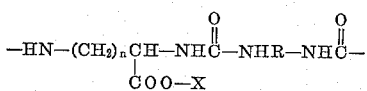

X in each of said recurring units is independently selected from the group consisting of (a) hydrogen, (b) alkali metals, and —$CH_2$—$R_1$ radicals; wherein $R_1$ is selected from the group consisting of hydrogen and alkyl radicals of 1–21 carbon atoms; $n$ in each of said units is independently selected from the group consisting of 3 and 4; and R in each of said units is independently selected from the class consisting of —$C_mH_{2m}$— groups, wherein $m$ is 2–10; phenylene; mononuclear divalent alkaryl radicals; mononuclear divalent aralkylene radicals; divalent cycloalkyl radicals; and divalent cycloalkyl alkylene radicals.

2. A polyurea defined in claim 1, with X being —$CH_2$—$R_1$, wherein $R_1$ is selected from the group consisting of hydrogen and alkyl radicals of 1–21 carbon atoms.

3. A polyurea defined in claim 1, with X being —$CH_3$.

4. A polyurea defined in claim 1, with X being sodium.

5. A polyurea defined in claim 1, with X being hydrogen.

6. A polyurea defined in claim 1, with X in some of said recurring units being sodium and in the others of said recurring units being selected from the group consisting of hydrogen and —$CH_2$—$R_1$ radicals, wherein $R_1$ is selected from the group consisting of hydrogen and alkyl radicals of 1–21 carbon atoms.

7. A polyurea defined in claim 1, with X in some of said recurring units being —$CH_3$ and in the others of said recurring units being sodium.

8. A polyurea defined in claim 1, with X in some of said recurring units being sodium and in the others of said recurring units being hydrogen.

9. A polyurea defined in claim 1, with X in some of said recurring units being sodium, in some of said recurring units being hydrogen and in the other of said recurring units being a radical —$CH_2$—$R_1$, with $R_1$ being selected from the group consisting of hydrogen and alkyl radicals of 1–21 carbon atoms.

10. The method for producing a polyurea comprising reacting (A) a material selected from the group consisting of a diisocyanate with the generic formula:

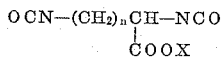

and mixtures thereof with (B) a material selected from the group containing of a diamine within the generic formula

and mixtures thereof; wherein X is an alkyl radical of 1–22 carbon atoms; R is a divalent hydrocarbon group of 2–10 carbon atoms; and $n$ is selected from the group consisting of 3 and 4.

11. The method defined in claim 9, wherein X is —$CH_3$.

12. The method for producing a polyurea consisting essentially of a unit which recurs and is within the generic formula:

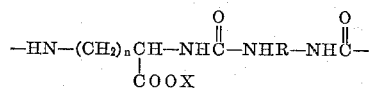

wherein X in each of said recurring units is independently selected from the group consisting of an alkali metal and an alkyl radical of 1–22 carbon atoms with the proviso that X in at least one of said units is an alkali metal and $n$ is selected from the group consisting of 3 and 4; comprising reacting (1) an alkaline agent whose anion is an alkali metal with (2) a dimethyl sulfoxide solution of a polyurea consisting essentially of a unit which recurs and is within generic formula:

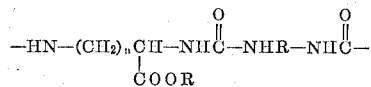

wherein R is an alkyl radical of 1–22 carbon atoms, the alkaline agent being employed in amounts sufficient to maintain the pH of the solution below about 10.

13. The method for producing a polyurea consisting essentially of a unit which recurs and is within generic formula:

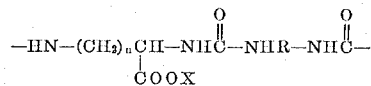

wherein X in each of said recurring units is selected from the group consisting of hydrogen and an alkali metal with the proviso that X in at least one of said units is hydrogen and $n$ is selected from the group consisting of 3 and 4; comprising the acid hydrolysis of an alkali metal salt thereof.

References Cited
UNITED STATES PATENTS

| | | | |
|---|---|---|---|
| 2,292,443 | 8/1942 | Hanford | 260—77.5 |
| 2,852,494 | 9/1958 | Lehmann et al. | 260—77.5 |
| 3,281,378 | 10/1966 | Garber et al. | 260—77.5 |

DONALD E. CZAJA, *Primary Examiner.*

M. I. MARQUIS, *Assistant Examiner.*